United States Patent
Morisaki et al.

(10) Patent No.: US 11,872,564 B2
(45) Date of Patent: Jan. 16, 2024

(54) THERMOSTATIC APPARATUS AND ANALYTICAL APPARATUS INCLUDING THE SAME

(71) Applicant: Hitachi High-Tech Science Corporation, Tokyo (JP)

(72) Inventors: Atsuki Morisaki, Tokyo (JP); Koji Yamamoto, Tokyo (JP); Masahito Ito, Tokyo (JP)

(73) Assignee: Hitachi High-Tech Science Corporation, Tokyo (JP)

( * ) Notice: Subject to any disclaimer, the term of this patent is extended or adjusted under 35 U.S.C. 154(b) by 0 days.

(21) Appl. No.: 16/106,935

(22) Filed: Aug. 21, 2018

(65) Prior Publication Data

US 2019/0060908 A1 Feb. 28, 2019

(30) Foreign Application Priority Data

Aug. 25, 2017 (JP) ................................ 2017-161961

(51) Int. Cl.
*B01L 7/00* (2006.01)
*G01N 1/30* (2006.01)
*G01N 35/00* (2006.01)

(52) U.S. Cl.
CPC .................. *B01L 7/00* (2013.01); *G01N 1/30* (2013.01); *G01N 35/00* (2013.01); *B01L 2200/02* (2013.01); *B01L 2300/041* (2013.01); *B01L 2300/0858* (2013.01); *B01L 2300/1805* (2013.01); *B01L 2400/0475* (2013.01);
(Continued)

(58) Field of Classification Search
None
See application file for complete search history.

(56) References Cited

U.S. PATENT DOCUMENTS 6,141,975 A 11/2000 Tatsumi
2001/0027949 A1* 10/2001 Safir .................. B01D 15/1885
210/635
(Continued)

FOREIGN PATENT DOCUMENTS

CN 106133499 A 11/2016
JP S63-109649 U 7/1988
(Continued)

OTHER PUBLICATIONS

Apr. 20, 2022—(CN) The Second Office Action—CN App 201810955251.3, Eng Tran.

*Primary Examiner* — Matthew D Krcha
(74) *Attorney, Agent, or Firm* — Banner & Witcoff, Ltd.

(57) ABSTRACT

A thermostatic apparatus thermostatically holds a sample container holding a sample. The thermostatic apparatus includes a sample rack which accommodates and holds a plurality of the sample containers and is attachable to and detachable from the thermostatic apparatus; and a heat conduction member which is controlled to a constant temperature and transfers heat to the sample container, in which an opening portion is formed in the sample rack, and when the sample rack is mounted on the thermostatic apparatus, a contact portion forming one part of the heat conduction member directly contacts the sample container by passing through the opening portion, or directly contacts the sample container protruding from the opening portion.

16 Claims, 12 Drawing Sheets

(52) U.S. Cl.
CPC .......... *G01N 35/00584* (2013.01); *G01N 2035/00356* (2013.01)

(56) References Cited

U.S. PATENT DOCUMENTS

| | | | | |
|---|---|---|---|---|
| 2003/0026740 A1* | 2/2003 | Staats | ............... | B01L 3/0268 422/503 |
| 2008/0003650 A1* | 1/2008 | Banerji | ............... | B01L 9/523 435/91.2 |
| 2012/0219473 A1* | 8/2012 | Ishii | ............... | B01L 7/00 422/561 |
| 2013/0240181 A1 | 9/2013 | Yasunaga | | |
| 2015/0346069 A1 | 12/2015 | Inoue | | |

FOREIGN PATENT DOCUMENTS

| | | | |
|---|---|---|---|
| JP | H02-141860 A | | 5/1990 |
| JP | 02-141860 | * | 11/1990 |
| JP | H02-141860 U | | 11/1990 |
| JP | H10-192719 A | | 7/1998 |
| JP | 2000-137031 A | | 5/2000 |
| JP | 2001-074750 A | | 3/2001 |
| JP | 2006-300589 A | | 11/2006 |
| JP | 2013-190245 A | | 9/2013 |
| WO | 2014-155674 A1 | | 10/2014 |

* cited by examiner

THERMOSTATIC APPARATUS AND ANALYTICAL APPARATUS INCLUDING THE SAME

This application claims priority from Japanese Patent Application No. 2017-161961 filed on Aug. 25, 2017, the entire subject-matter of which is incorporated herein by reference.

TECHNICAL FIELD

The disclosure relates to a thermostatic apparatus and an analytical apparatus including the same.

BACKGROUND ART

In a liquid chromatography apparatus, a plurality of sample containers for holding samples are accommodated in a sample rack, each sample rack is mounted to an auto-sampler, and the samples in the sample containers are sucked by a suction needle of the auto-sampler and are introduced into the liquid chromatography apparatus so as to perform an analysis.

Here, in order to prevent decomposition of the samples, volatilization of solvents, in which the samples are dissolved, or the like, the sample containers may be cooled. There has been developed a technology for cooling a sample container (sample) by making a cooling part contact a bottom surface of a sample rack which is formed of a metal excellent in heat conduction (refer to WO 2014/155674 A1).

In a case where the cooling part is brought into contact with the bottom surface of the sample rack, cooling is performed by transferring (taking) heat from the sample rack to the cooling portion mainly by heat conduction.

However, since surfaces of the sample rack and the cooling part are not completely plane surfaces and have fine unevenness, instead, an air layer exists between the two surfaces, and heat conduction is inhibited. In addition, since the sample rack is generally large to accommodate a large number of sample containers, the heat capacity thereof is also large, and therefore it takes time to cool the sample rack. Further, since an upper surface and a side surface of the sample rack are generally exposed to the outside, the sample rack is warmed up by outside air at these parts, so that cooling efficiency decreases.

Meanwhile, in order to shorten cooling time of the sample rack, it is preferable to improve cooling capability of the cooling part, but a size and power consumption of the apparatus are increased.

In addition, condensation water may be generated on surfaces of the sample containers when the sample containers are cooled. However, it is difficult to discharge the condensation water from the sample rack, so that moisture from the condensation water may affect analytical accuracy. Therefore, the related-art technology of WO 2014/155674 A1 is provided with a device, which is separated from the cooling part, and which dehumidifies air of measured atmosphere. However, it increases the cost.

SUMMARY

Illustrative aspects of the disclosure provide a thermostatic apparatus, which can thermostatically hold the sample container while suppressing increase in size and power consumption of the apparatus, and which can discharge the condensation water during cooling easily, and provide an analytical apparatus including the thermostatic apparatus.

According to one illustrative aspect of the disclosure, there may be provided a thermostatic apparatus configured to thermostatically hold a sample container, the sample container being configured to hold a sample, the thermostatic apparatus comprising: a sample rack configured to accommodate and hold a plurality of the sample containers, the sample rack being attachable to and detachable from the thermostatic apparatus, the sample rack comprising an opening portion; and a heat conduction member configured to be controlled to a constant temperature and to transfer heat to the sample container, wherein the heat conduction member comprises a contact portion configured to directly contact the sample container when the sample rack is mounted on the thermostatic apparatus, the contact portion directly contacting the sample container through the opening portion or directly contacting the sample container that protrudes from the opening portion.

According to the thermostatic apparatus, when the sample rack is mounted on the thermostatic apparatus, the contact portion directly contacts the sample containers via the opening portion or directly contacts the sample containers protruding from the opening portion. Therefore, heat can be effectively transferred to (or taken from) the sample containers, and it becomes possible to thermostatically hold the sample containers rapidly while suppressing increase in size and power consumption of the apparatus, compared with a case where the heat conduction member is brought into contact with the sample rack and heat is transferred to (or taken from) the sample containers indirectly.

In addition, since the opening portion is formed in the sample rack, even if condensation water is generated on the surfaces of the sample containers when the sample containers are cooled, the condensation water is easily discharged through the opening portion.

In the thermostatic apparatus of the disclosure, the opening portion may be formed in a bottom surface of the sample rack, and the contact portion may directly contact a bottom surface of the sample container.

According to the thermostatic apparatus, since the contact portion directly contacts the bottom surface of the sample container, heat can be more effectively transferred to (or taken from) the sample container.

In the thermostatic apparatus of the disclosure, the heat conduction member may have an inner bottom surface that is located further downward than the sample rack, and the inner bottom surface of the heat conduction member may form a flow path, the flow path descending in one direction and configured to discharge condensation water generated during cooling of the sample container to the outside.

According to the thermostatic apparatus, the condensation water generated during cooling of the sample containers falls from the opening portion to the bottom surface of the heat conduction member, and flows along the inclination so as to be discharged to the outside, so that the condensation water can be discharged more rapidly to the outside.

In the thermostatic apparatus of the disclosure, the heat conduction member may further comprise a groove extending in a first direction, and an inner bottom surface of the groove may form a flow path, the flow path descending from a first end of the groove toward a second end of the groove and being configured to discharge condensation water generated during cooling of the sample container to the outside through the second end.

In the thermostatic apparatus of the disclosure, the first end of the groove may not be communicated with a first side surface of the sample rack, and the second end of the groove may be communicated with a second side surface of the sample rack.

In the thermostatic apparatus of the disclosure, the sample rack may comprise a stopper extending in the first direction at a lower side of the opening portion, and the stopper may be accommodated in the groove when the sample rack is attached to the heat conduction member.

In the thermostatic apparatus of the disclosure, a depth of the groove at the second end may be greater than a projection height of the stopper from a back surface of the sample rack.

In the thermostatic apparatus of the disclosure, the sample rack may be attachable to and detachable from the thermostatic apparatus in a first direction, and the heat conduction member may further comprise a groove extending in the first direction.

In the thermostatic apparatus of the disclosure, the sample rack may comprise a stopper extending in the first direction at a lower side of the opening portion, and the stopper may be accommodated in the groove when the sample rack is mounted on the heat conduction member.

In the thermostatic apparatus of the disclosure, the opening portion may comprise: a first opening opened on a front surface of the sample rack and configured to accommodate and hold the sample container; and a second opening extending in a first direction and opened on a side surface of the sample rack, the second opening being communicated with the first opening.

In the thermostatic apparatus of the disclosure, a plurality of the second openings may be disposed on the side surface of the sample rack along a second direction that is substantially perpendicular to the first direction.

In the thermostatic apparatus of the disclosure, the sample rack may be attachable to and detachable from the heat conduction member in a first direction, and at least one of the sample rack and the heat conduction member may further comprise a plurality of openings opened on a side surface thereof along a second direction, the second direction being substantially perpendicular to the first direction.

The disclosure may provide an analytical apparatus including the above-described thermostatic apparatus.

The analytical apparatus of the disclosure may further comprise: a mobile phase container accommodating a mobile phase; an auto-sampler; a pump configured to feed the mobile phase from the mobile phase container to the auto-sampler; a separation column; a column oven configured to accommodate the separation column; a detector; a waste liquid container; and a computer, wherein the thermostatic apparatus is attached to the auto-sampler.

According to the disclosure, it is possible to suppress the increase in size and power consumption of the thermostatic apparatus and to thermostatically hold the sample container, and the condensation water can be easily discharged during cooling.

DETAILED DESCRIPTION

Hereinafter, embodiments of the disclosure will be described with reference to the drawings.

Figure 1:
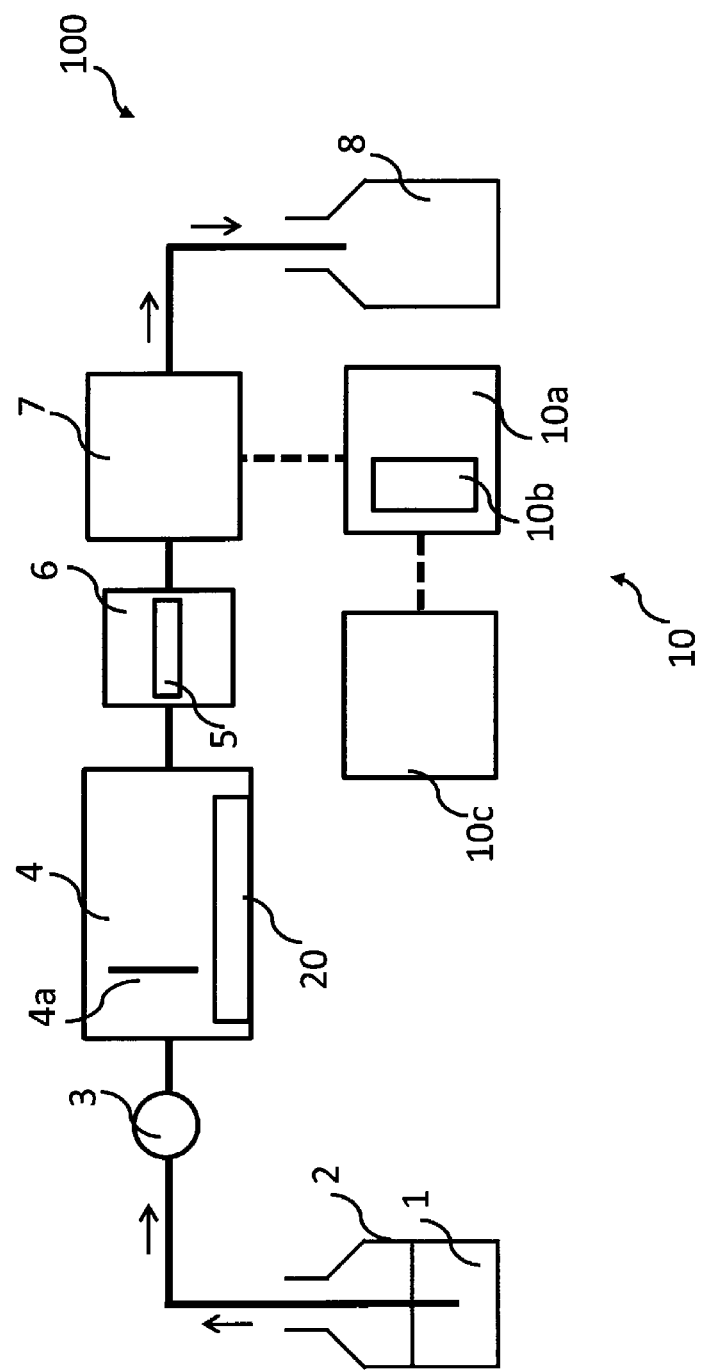
FIG. 1 is a diagram showing a configuration of a thermostatic apparatus and an analytical apparatus including the same according to an embodiment of the disclosure.
Figure 2:
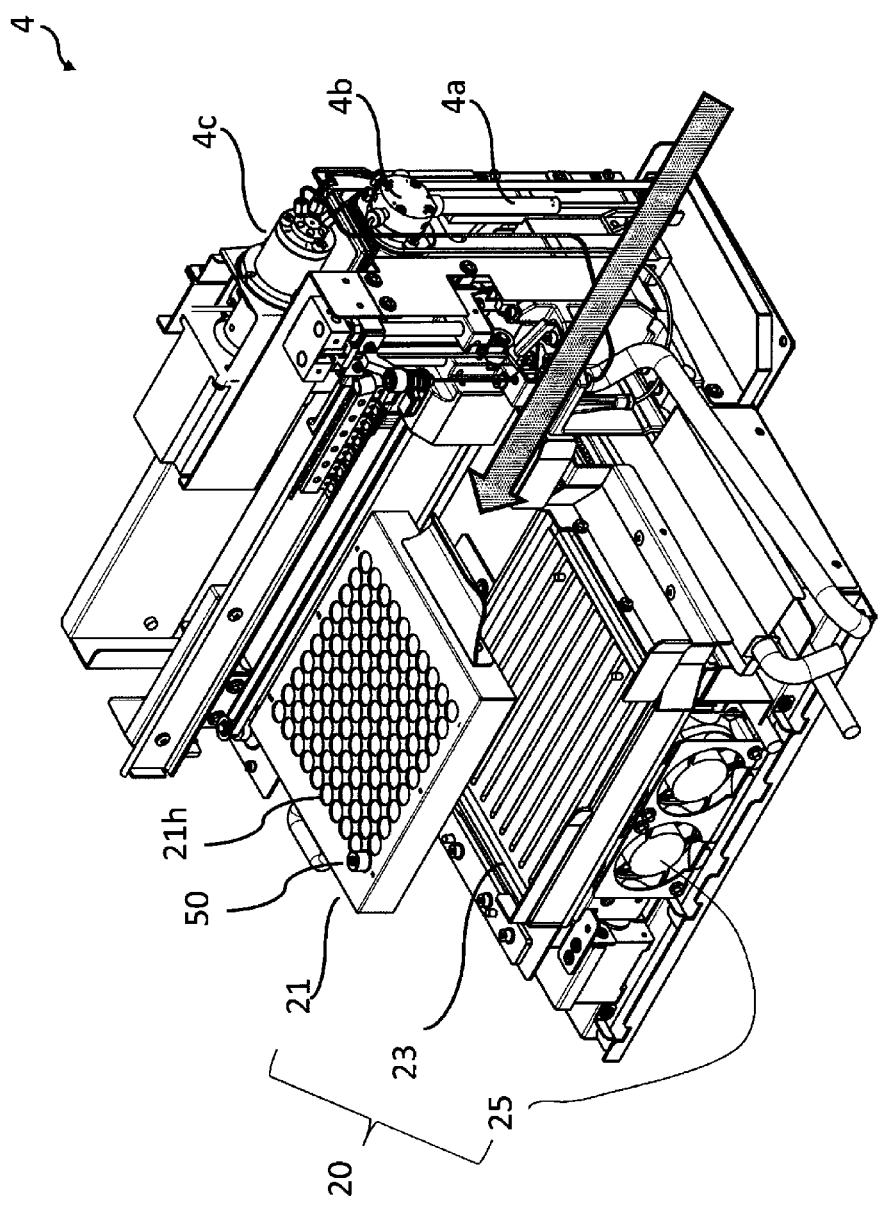
FIG. 2 is a view showing a configuration of the thermostatic apparatus.
Figure 3:
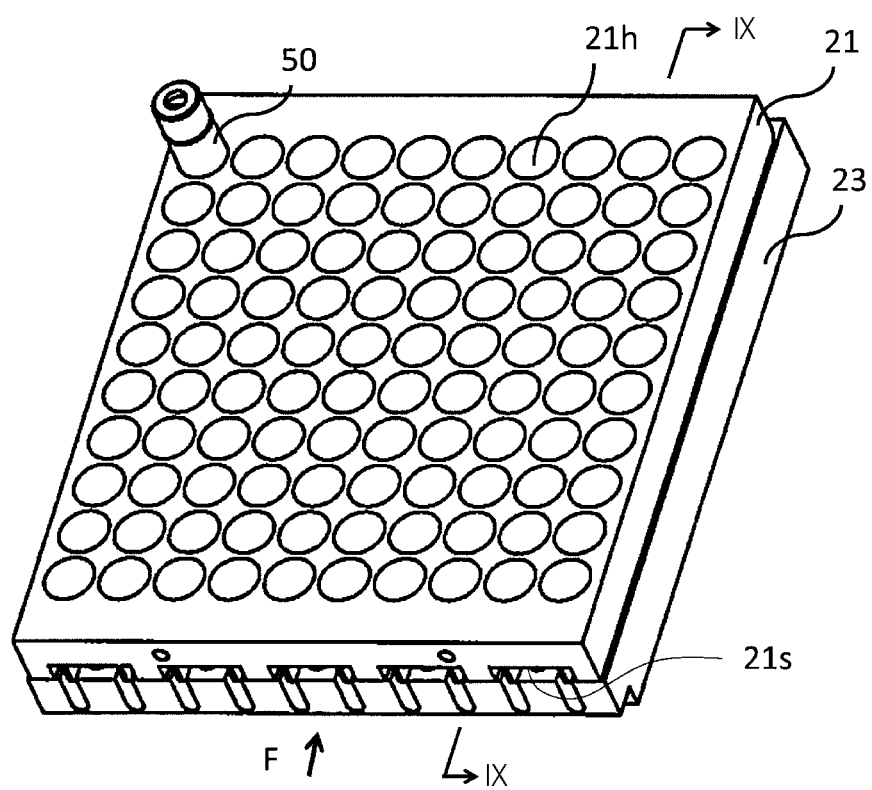
FIG. 3 is an enlarged perspective view of the thermostatic apparatus.

FIG. 1 is a view showing a configuration of a liquid chromatography apparatus (analytical apparatus) 100 according to an embodiment of the disclosure, FIG. 2 is a view showing a configuration of a thermostatic apparatus 20, and FIG. 3 is an enlarged perspective view of the thermostatic apparatus 20.

The liquid chromatography apparatus 100 includes a mobile phase container 2 accommodating a mobile phase 1 (solvent), an auto-sampler 4, a pump 3 for feeding the mobile phase 1 from the mobile phase container 2 to the auto-sampler 4, the thermostatic apparatus 20 attached to the auto-sampler 4, a separation column 5, a column oven 6 for accommodating the separation column 5, a detector 7, a waste liquid container 8, a computer 10 or the like. The computer 10 includes a processing unit (CPU) 10a, a data holding unit 10b including a hard disk or the like, and a display unit 10c.

A suction needle (syringe) 4a is provided at the auto-sampler 4. The suction needle 4a sucks a sample from a sample container 50 (see FIG. 2) that is arranged at the thermostatic apparatus 20 and feeds the sample into the separation column 5 together with the mobile phase 1. The sample fed into the separation column 5 is detected by the detector 7, and a detection signal (chromatogram) is analyzed and displayed or the like by the computer 10.

As shown in FIGS. 2 and 3, the thermostatic apparatus 20 includes a sample rack 21 which accommodates a plurality of sample containers 50 and is attachable to/detachable from the auto-sampler 4, a heat conduction member 23 which is attached to the auto-sampler 4 and a thermostatic unit 25 which controls the heat conduction member 23 to a constant temperature.

In the present embodiment, the thermostatic unit 25 includes a cooling member such as a Peltier element, a fan for cooling a heating generation portion of the Peltier element, a control circuit or the like. A cooling surface of the Peltier element thermally contacts a lower surface of the heat conduction member 23, and heat of the heat conduction member 23 is taken, so that cooling is performed at a constant temperature (for example, 4° C.).

The sample container 50 includes a cylindrical glass bottle and a lid. The sample rack 21 has a substantially box shape. The sample rack 31 is provided with a plurality of through holes 21$h$ having a diameter slightly larger than that of each sample container 50 and being opened upward and downward, and the sample containers 50 are inserted into each through hole 21$h$ from above. Incidentally, a plurality of stoppers 21$s$ (see FIG. 4) for preventing the sample containers 50 from falling off are provided at a lower side of the through holes 21$h$.

The through hole 21$h$ is one example of an opening portion.

Figure 4:
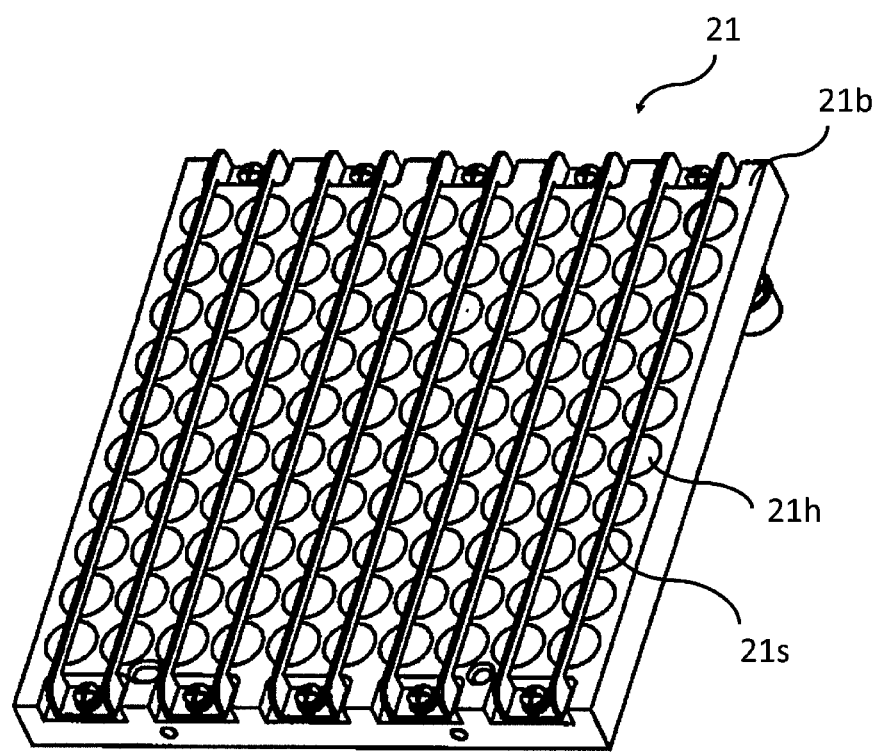
FIG. 4 is a perspective view of a back surface of a sample rack.
Figure 7:
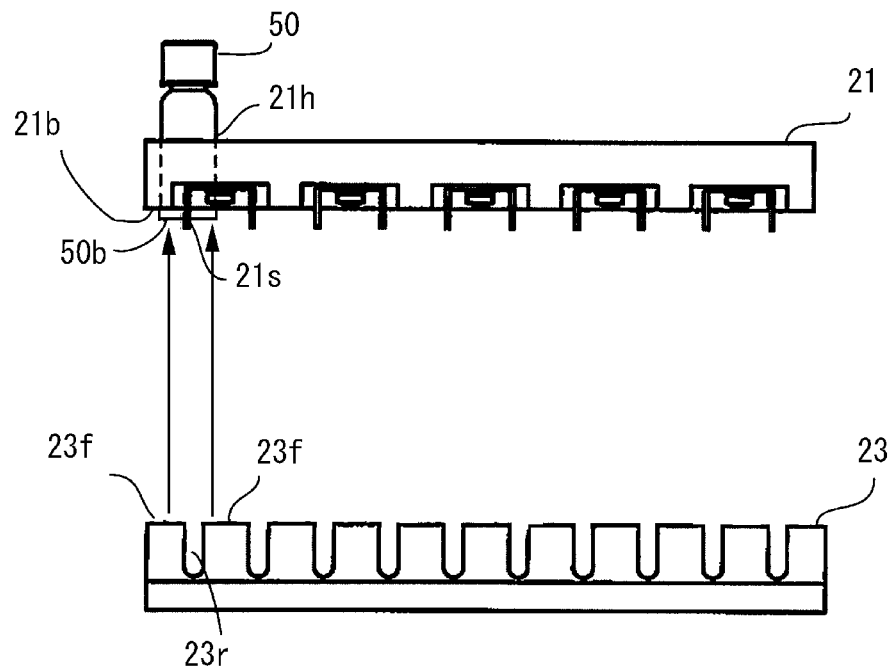
FIG. 7 is a view showing a state where a bottom surface of a sample container protrudes further downward than the sample rack.

As shown in FIG. 4, the stopper 21$s$ is a strip-shaped member which is separated from a back surface 21$b$ of the sample rack 21 and overlaps the through hole 21$h$ when viewed from a vertical direction. In the present embodiment, the stopper 21$s$ is arranged to extend in one direction of the sample rack 21 and to overlap centers of each row of the through holes 21$h$ along the above-described one direction. Further, as shown in FIG. 7 which is to be described later, a bottom surface of the sample container 50 which falls to a lower side of the through hole 21$h$ is supported by the stopper 21$s$, and therefore the bottom surface of the sample container 50 is exposed.

Incidentally, the stopper 21$s$ is formed by bending a stainless plate cut out in a rectangle shape into a U shape such that sides in a longitudinal direction are parallel, and the stopper 21$s$ is attached by fastening both ends in the longitudinal direction of the stopper 21$s$ onto the back surface 21$b$ of the sample rack 21 with screws. Further, the stopper 21$s$ is separated from the back surface 21$b$ of the sample rack 21 and protrudes further than the back surface 21$b$.

Further, the sample rack 21 is mounted on the heat conduction member 23 while being slid in the horizontal direction (see arrow from front to back in FIG. 2 and arrow F in FIG. 3), and the heat conduction member 23 and the sample rack 21 are brought into thermal contact with each other.

For this reason, the heat conduction member 23 and the sample rack 21 are formed of aluminum with excellent heat conduction.

Incidentally, when sucking the sample from the sample container 50 with the suction needle (syringe) 4$a$, a syringe switching valve 4$b$ and an injection switching valve 4$c$ are switched appropriately.

Figure 5:
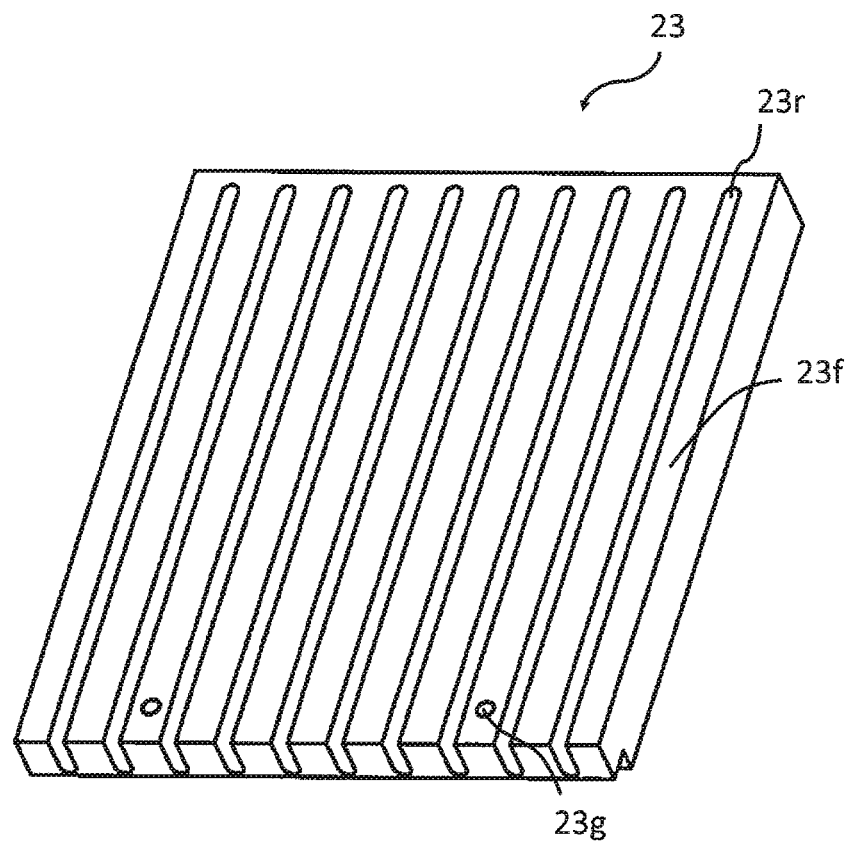
FIG. 5 is a perspective view of a heat conduction member.

On the other hand, as shown in FIG. 5, a plurality of grooves 23$r$ extending in one direction and positioning holes 23$g$ are provided on an upper surface 23$f$ of the heat conduction member 23. The extending direction of the groove 23$r$ and the number thereof are the same with the stopper 21$s$.

Figure 6:
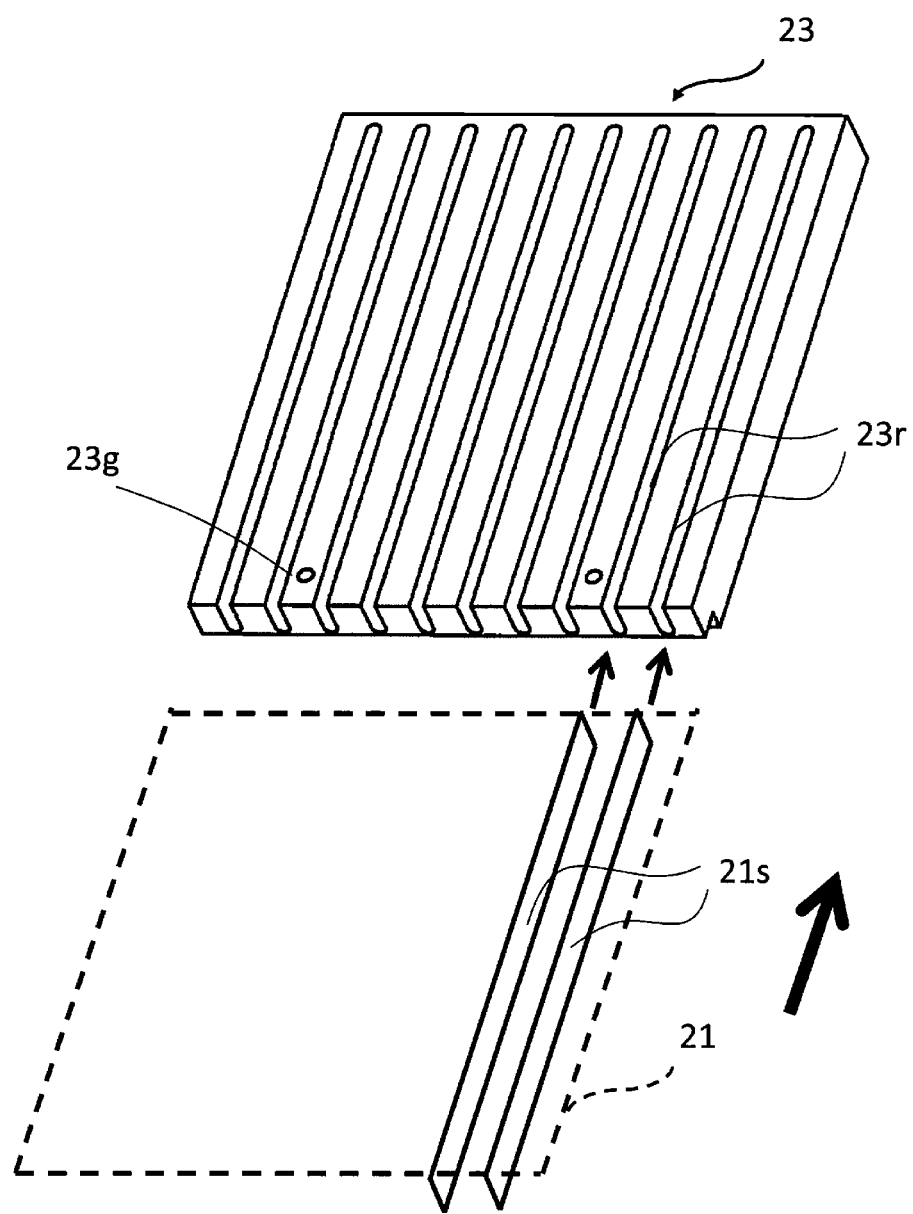
FIG. 6 is a view showing a state where the sample rack is slid in a horizontal direction to be mounted to the heat conduction member.

Therefore, as shown in FIG. 6, when the sample rack 21 is mounted on the heat conduction member 23 while being slid in the horizontal direction, each stopper 21$s$ is accommodated in respective groove 23$r$. Further, after the sample rack 21 is mounted, the sample rack 21 and the heat conduction member 23 are positioned by inserting positioning pins (not shown) of the sample rack 21 into the positioning holes 23$g$.

Next, a contact state between the heat conduction member 23 and the sample container 50, which is a characterizing part of the disclosure, will be described with reference to FIGS. 7 to 9.

As shown in FIG. 7, when the sample container 50 is inserted into the through hole 21$h$ of the sample rack 21, a bottom surface 50$b$ of the sample container 50 which falls to a lower side of the through hole 21$h$ is supported by an upper surface of the stopper 21$s$. Further, the bottom surface 50$b$ of the sample container 50 protrudes slightly further downward than the back surface 21$b$ of the sample rack 21.

At this time, at the mounting position of the sample rack 21, the groove 23$r$ of the heat conduction member 23 faces the stopper 21$s$, and adjacent upper surfaces 23$f$ on both sides of the groove 23$r$ face the bottom surface 50$b$ of the sample container 50 (see arrow in the FIG. 7).

Figure 8:
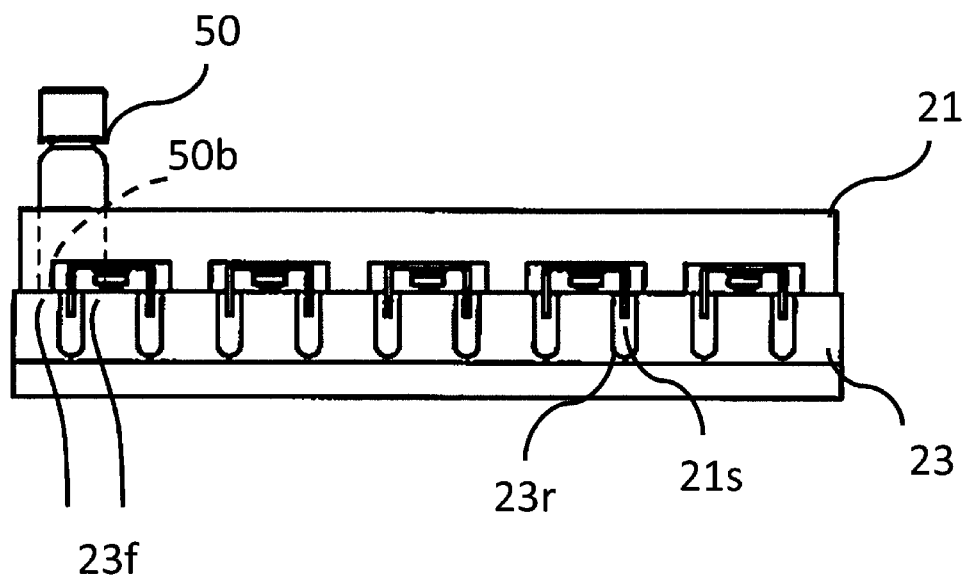
FIG. 8 is a view showing a state where the heat conduction member directly contacts the sample container when the sample rack is mounted on the heat conduction member.

Therefore, when the sample rack 21 is mounted on the heat conduction member 23 while being slid in the horizontal direction as shown in FIG. 6, each stopper 21$s$ is accommodated in respective groove 23$r$ as shown in FIG. 8, and the adjacent upper surfaces 23$f$ on both sides of the groove 23$r$ directly contact the bottom surface 50$b$ while slightly pushing up the bottom surface 50$b$ of the sample container 50.

Thus, compared with a case where the heat conduction member 23 contacts the sample rack 21 and the heat is indirectly transferred to (or taken from) the sample container 50, the heat can be effectively transferred to (or taken from) the sample container 50, and it becomes possible to thermostatically hold the sample container 50 quickly while suppressing the increase in size and energy consumption of the apparatus.

In the sample rack 21, each through hole 21$h$ is formed for respective sample container 50. Thus, even if condensation water is generated on a surface of the sample container 50 when the sample container 50 is cooled, the condensation water is easy to be discharged through the through hole 21$h$. As a result, it is possible to suppress the influence of moisture from the condensation water on analysis accuracy.

Incidentally, the upper surface 23$f$ of the heat conduction member 23 is one example of a contact portion.

Figure 9:
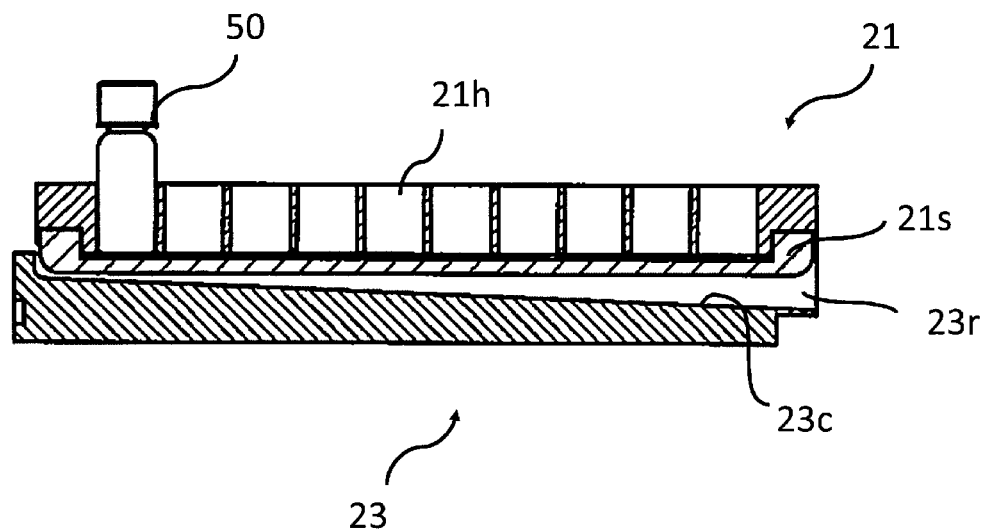
FIG. 9 is a cross sectional view taken along a line IX-IX in FIG. 3.

As shown in FIG. 9, in the present embodiment, a bottom surface 23$c$ of each groove 23$r$ of the heat conduction member 23 is located further downward than the sample rack 21 and descends in one direction (e.g., extending direction of each stopper 21$s$, toward right in FIG. 9). Therefore, the condensation water generated during the cooling of the sample container 50 drops from the though hole 21$h$ to the bottom surface 23$c$, flows along the inclination thereof toward the right side in FIG. 9 and is discharged to the outside. That is, the bottom surface 23$c$ forms a discharge flow path of the condensation water.

Thus, the condensation water can be discharged to the outside more quickly.

The disclosure is not limited to the above-described embodiment, and it goes without saying that it extends to various modifications and equivalents included in the spirit and scope of the disclosure.

Figure 10:
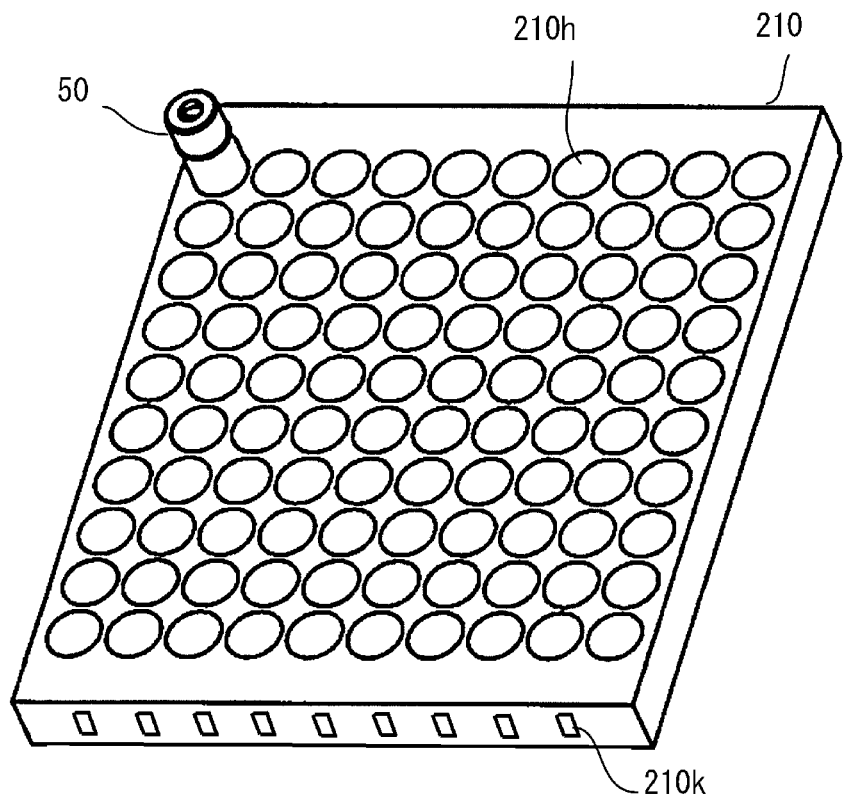
FIG. 10 is a perspective view of a sample rack according to a modification of the disclosure.
Figure 11:
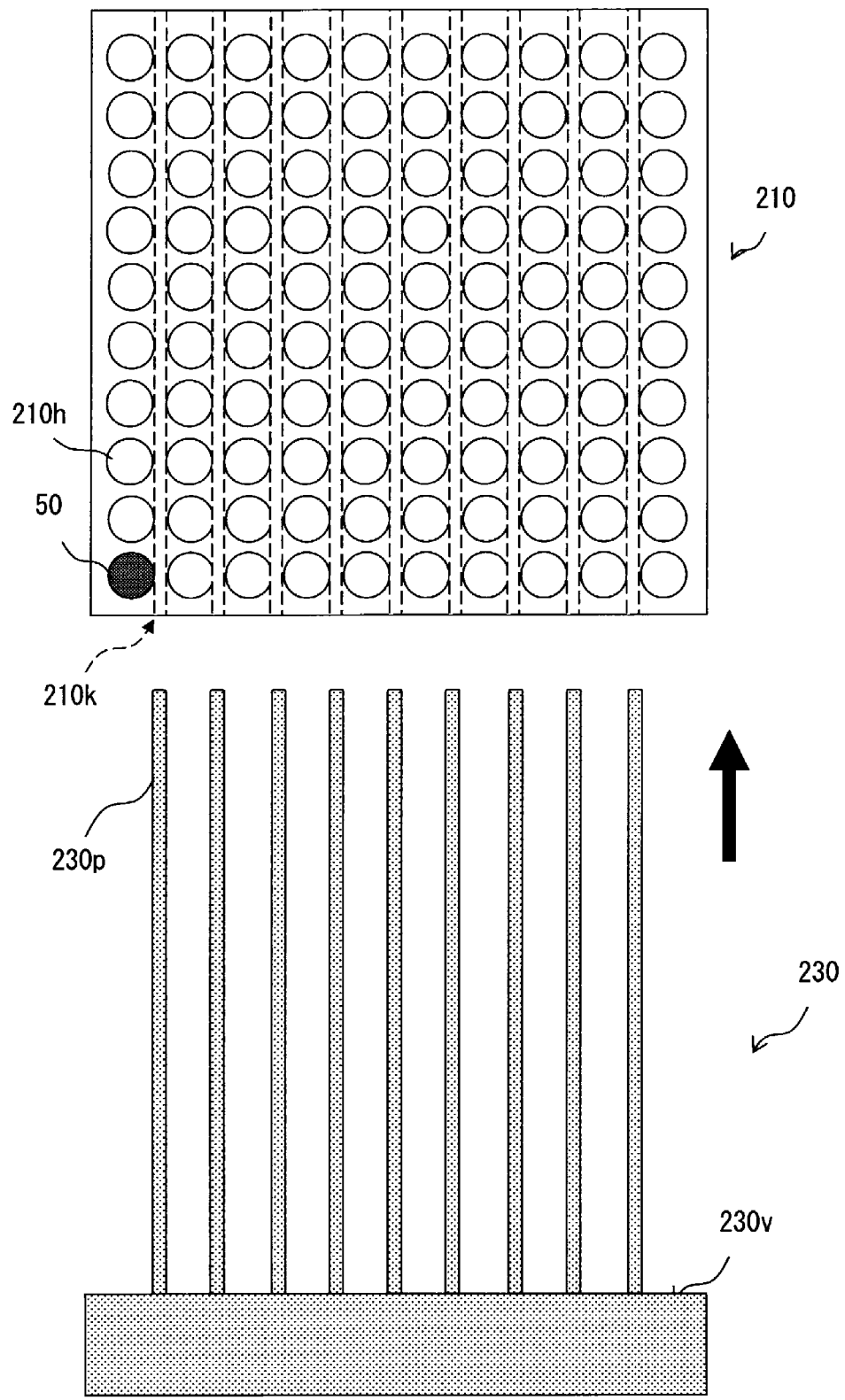
FIG. 11 is a plan view of the thermostatic apparatus including the sample rack in FIG. 10.

For example, as shown in FIG. 10, it may be configured to form a plurality of slits 210$k$ extending in one direction (from front to back in FIG. 10) in a side surface of a sample rack 210 and insert protruding portions 230$p$ of a heat conduction member 230 shown in FIG. 11 into the slits 210$k$, and thus the sample container 50 may be held thermostatically.

Specifically, as shown in FIG. 11, the slit 210$k$ is separated from through holes 210$h$ (same as the through holes 21$h$ in FIG. 3) for accommodating each sample container 50. The slit 210$k$ penetrates through the sample rack 210 between the through holes 210$h$ which are adjacent in a direction perpendicular to the above-described one direction so as to form rectangular through holes extending in the above-described one direction. The slit 210$k$ is in communication with the through hole 210$h$, and a part of side walls of the through holes 210h are opened and is connected to the slit 210k. In FIG. 11, nine slits 210k in total are provided.

On the other hand, nine protruding portions 230p of the heat conduction member 230 are provided in a comb tooth shape to face each slit 210k, and a base portion of the protruding portions 230p is connected to a base 230v integrally. Further, the base 230v thermally contacts a thermostatic unit (not shown) and is held thermostatically, so that the heat of the thermostatic unit is transferred to each slit 210k.

Figure 12:
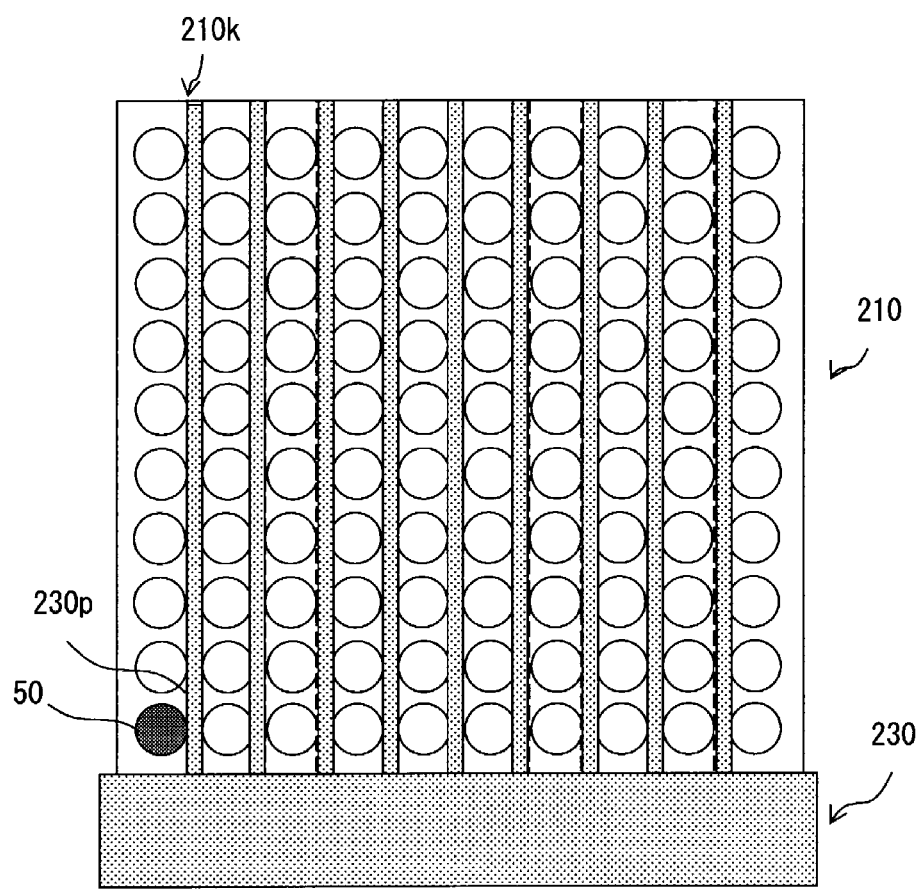
FIG. 12 is a view showing a state where the sample rack in FIG. 11 is mounted on the heat conduction member.

Further, as shown in FIG. 12, when each protruding portion 230p is inserted into respective slit 210k while being slid in the horizontal direction, each protruding portion 230p directly contacts a side wall of sample container 50 with passing through the through hole 210h that is in communication with each slit 210k.

In this way, compared with a case where the heat conduction member 230 contacts with the sample rack 210 and heat is indirectly transferred to (or taken from) the sample container 50, the heat can be effectively transferred to (taken from) the sample container 50. Further, the condensation water is easy to be discharged from the slit 210k.

Incidentally, the slit 210k and the through hole 210h are one example of the opening portion, and the protruding portion 230p is one example of the contact portion.

As described above, the case of the sample rack 21 in FIGS. 3 and 4 is an aspect in which the bottom surface of the sample container 50 protrudes from the opening portion (the through hole 21h) and the contact portion (the upper surface 23f) directly contacts the protruding portion.

On the other hand, the case of the sample rack 210 in FIGS. 10 and 11 is an aspect in which the sample container 50 does not protrude from the opening portion (the slit 210k and the through hole 210h), and the contact portion (protruding portion 230p) directly contacts the sample container 50 through the opening portion (with entering into the opening portion).

Incidentally, for example, a case where the opening portion (the through hole 21h) and the bottom surface of the sample container 50 in the sample rack 21 are aligned with each other, is regarded as the aspect in which the contact portion (the upper surface 23f) directly contacts the bottom surface of the sample container 50 through the opening portion.

Figure 13:
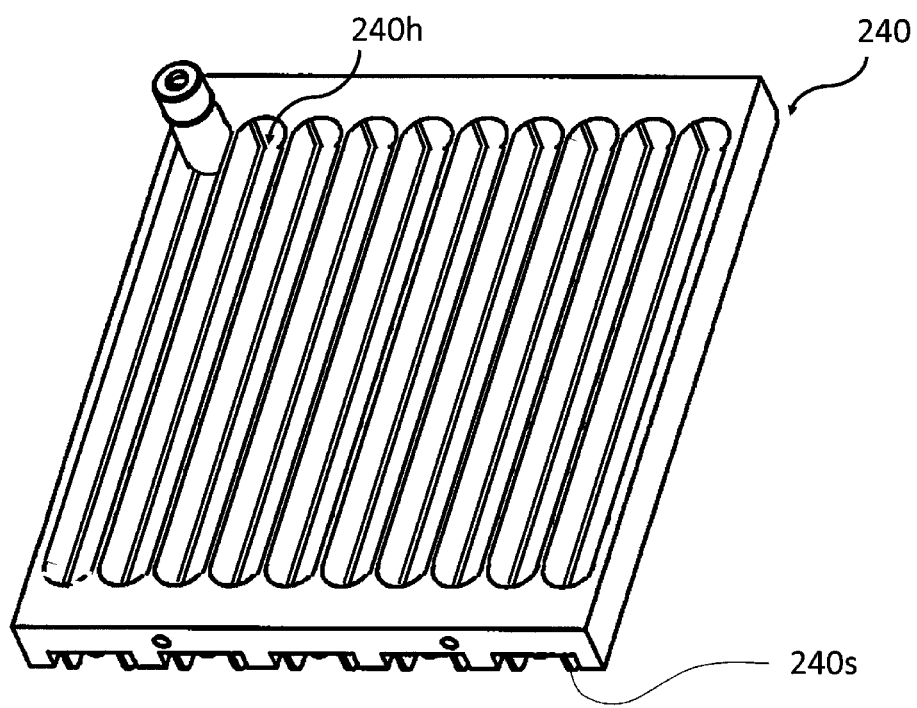
FIG. 13 is a perspective view of a sample rack according to another modification of the disclosure.

Further, the "opening portion" may not be formed for each sample container 50. For example, as shown in FIG. 13, a plurality of oval-shaped (e.g., rounded rectangular-shaped) through holes 240h extending in one direction of a sample rack 240 may be provided, and a plurality of the sample containers 50 may be accommodated and held along the longitudinal direction of one through hole 240h by configuring the through hole 240h such that a short diameter thereof is slightly larger than a diameter of the sample container 50 and a long diameter thereof is slightly larger than the multiple of the diameter of the sample container 50.

Incidentally, stoppers 240s which are the same as the stoppers 21s in FIG. 4 are attached to the sample rack 240 to hold the bottom surfaces of the sample containers 50.

Figure 14:
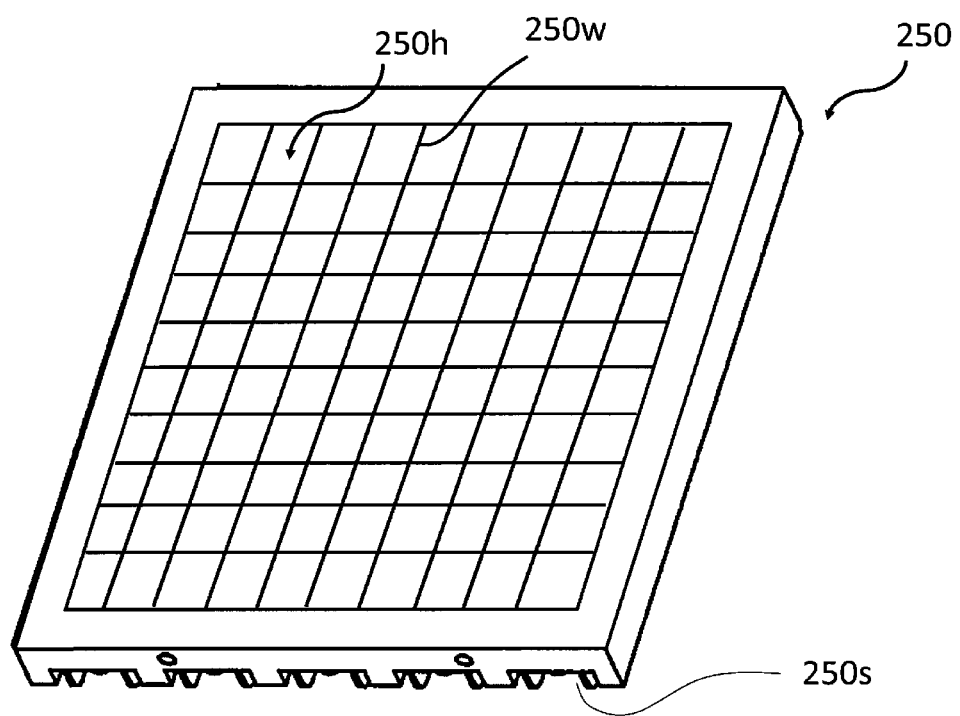
FIG. 14 is a perspective view of a sample rack according to still another modification of the disclosure.

Similarly, for example, as shown in FIG. 14, only an outer periphery of a sample rack 250 remains in a frame shape and one large rectangular through hole 250h (the opening portion) is provided inside this outer periphery; further, a plurality of wires 250w are arranged in a grid pattern with intervals in the vertical and horizontal directions on the through hole 250h, so that each sample container 50 may be accommodated right in each grid. Thus, a plurality of sample containers 50 can be accommodated and held by being supported by the wires 250w in one through hole 250h.

Incidentally, stoppers 250s which are the same as the stoppers 21s in FIG. 4 are attached to the sample rack 250 to hold the bottom surfaces of the sample containers 50.

The sample rack "holding the sample container" means that the sample container accommodated in the sample rack does not fall off and the sample rack can be moved together with the sample container. For example, in the case of FIG. 4, the opening portion 21h and the stopper 21s have the function of "holding the sample container".

The heat conduction member and the sample rack may be formed of a metal with excellent heat conduction or a resin, in addition to aluminum.

Further, the thermostatic apparatus is not limited to an apparatus which cools a sample container to a constant temperature, and may also heat the sample container to a constant temperature (for example, 37° C.). Incidentally, the thermostatic unit of the thermostatic apparatus may include a heating member such as a heater in addition to a cooling member such as a Peltier element, and may include both the cooling member and the heating member.

The analytical system including the thermostatic apparatus is not limited to a liquid chromatography apparatus.

What is claimed is:

1. A thermostatic apparatus configured to thermostatically hold a sample container, the sample container being configured to hold a sample, the thermostatic apparatus comprising:
   a sample rack configured to accommodate and hold a plurality of the sample containers, the sample rack being attachable to and detachable from the thermostatic apparatus, the sample rack comprising an opening portion; and
   a heat conduction member configured to be controlled to a constant temperature and to transfer heat to the sample container,
   wherein the sample rack is attachable to and detachable from the heat conduction member in a first direction,
   wherein an uppermost surface of the heat conduction member configures a contact portion configured to directly contact a bottom surface of the sample container when the sample rack is mounted on the thermostatic apparatus, the contact portion directly contacting the sample container that protrudes from the opening portion in a second direction perpendicular to the first direction,
   wherein the heat conduction member further comprises a groove extending in the first direction provided on the uppermost surface of the heat conduction member,
   wherein the sample rack comprises a stopper extending in the first direction at a lower side of the opening portion,
   wherein the stopper is accommodated in the groove when the sample rack is mounted on the heat conduction member, and
   wherein the stopper is arranged to overlap a center of the opening portion along the first direction.

2. The thermostatic apparatus according to claim 1, wherein the opening portion is formed in a bottom surface of the sample rack.

3. The thermostatic apparatus according to claim 1, wherein the heat conduction member has an inner bottom surface that is located further downward than the sample rack, and
   wherein the inner bottom surface of the heat conduction member forms a flow path, the flow path descending in one direction and configured to discharge condensation water generated during cooling of the sample container, when the sample rack is mounted on the thermostatic apparatus and accommodating and holding the sample container, to the outside.

4. The thermostatic apparatus according to claim 1, wherein an inner bottom surface of the groove forms a flow path, the flow path descending from a first end of the groove toward a second end of the groove and being configured to discharge condensation water generated during cooling of the sample container, when the sample rack is mounted on the thermostatic apparatus and accommodating and holding the sample container, to the outside through the second end.

5. The thermostatic apparatus according to claim 4, wherein the first end of the groove is not communicated with a first side surface of the sample rack, and the second end of the groove is communicated with a second side surface of the sample rack.

6. The thermostatic apparatus according to claim 4, wherein a depth of the groove at the second end is greater than a projection height of the stopper from a back surface of the sample rack.

7. The thermostatic apparatus according to claim 1, wherein at least one of the sample rack and the heat conduction member further comprises a plurality of openings opened on a side surface thereof along a second direction, the second direction being substantially perpendicular to the first direction.

8. An analytical apparatus comprising: the thermostatic apparatus according to claim 1.

9. The analytical apparatus according to claim 8, further comprising:
a mobile phase container accommodating a mobile phase;
an auto-sampler;
a pump configured to feed the mobile phase from the mobile phase container to the auto-sampler;
a separation column;
a column oven configured to accommodate the separation column;
a detector;
a waste liquid container; and
a computer,
wherein the thermostatic apparatus is attached to the auto-sampler.

10. The thermostatic apparatus according to claim 1, wherein when the sample rack is mounted on the heat conduction member, adjacent uppermost surfaces on both sides of the groove are configured to, when the sample rack is accommodating and holding the sample container, directly contact the bottom surface while pushing up the bottom surface of the sample container.

11. The thermostatic apparatus according to claim 1, wherein the stopper is a strip-shaped member.

12. A thermostatic apparatus configured to thermostatically hold a sample container, the sample container being configured to hold a sample, the thermostatic apparatus comprising:
a sample rack configured to accommodate and hold a plurality of the sample containers, the sample rack being attachable to and detachable from the thermostatic apparatus, the sample rack comprising an opening portion; and
a heat conduction member configured to be controlled to a constant temperature and to transfer heat to the sample container,
wherein the heat conduction member comprises a contact portion configured to directly contact the sample container when the sample rack is mounted on the thermostatic apparatus, the contact portion directly contacting the sample container through the opening portion,
wherein the opening portion comprises:
a first opening opened on a front surface of the sample rack and configured to accommodate and hold the sample container; and
a second opening extending in a first direction and opened on a side surface of the sample rack, the second opening being communicated with the first opening,
wherein the sample rack is attachable to and detachable from the heat conduction member in the first direction, and
wherein when the contact portion is inserted into the second opening, the contact portion directly contacts a side wall of the sample container along a second direction, which passes through the first opening that is in communication with the second opening, the second direction being substantially perpendicular to the first direction.

13. The thermostatic apparatus according to claim 12, wherein a plurality of second openings are disposed on the side surface of the sample rack along the second direction.

14. The thermostatic apparatus according to claim 12, wherein at least one of the sample rack and the heat conduction member further comprises a plurality of openings opened on a side surface thereof along the second direction.

15. A thermostatic apparatus configured to thermostatically hold a sample container, the sample container being configured to hold a sample, the thermostatic apparatus comprising:
a sample rack configured to accommodate and hold a plurality of the sample containers, the sample rack being attachable to and detachable from the thermostatic apparatus, the sample rack comprising an opening portion formed in a bottom surface of the sample rack; and
a heat conduction member configured to be controlled to a constant temperature and to transfer heat to the sample container,
wherein the sample rack is attachable to and detachable from the heat conduction member in a first direction,
wherein an uppermost surface of the heat conduction member configures a contact portion configured to, when the sample rack is mounted on the thermostatic apparatus and accommodating and holding the sample container, directly contact the bottom surface of the sample container that protrudes from the opening portion in a second direction perpendicular to the first direction,
wherein the heat conduction member further comprises a groove extending in the first direction provided on the uppermost surface of the heat conduction member,
wherein the sample rack comprises a stopper extending in the first direction at a lower side of the opening portion, and
wherein the stopper is accommodated in the groove when the sample rack is mounted on the heat conduction member.

16. The thermostatic apparatus according to claim 15, wherein the groove is open at one end to receive the sample in the first direction.

* * * * *